(12) United States Patent
Lykken et al.

(10) Patent No.: US 12,467,221 B2
(45) Date of Patent: Nov. 11, 2025

(54) LOADER WITH AUXILIARY MOTOR ON ATTACHMENT INTERFACE AND ATTACHMENT THEREFORE

(71) Applicant: MAC Company, LLC, Battle Lake, MN (US)

(72) Inventors: Thomas G. Lykken, Fargo, ND (US); Peter J. Christianson, Fargo, ND (US)

( * ) Notice: Subject to any disclaimer, the term of this patent is extended or adjusted under 35 U.S.C. 154(b) by 856 days.

(21) Appl. No.: 17/653,206

(22) Filed: Mar. 2, 2022

(65) Prior Publication Data

US 2022/0282445 A1  Sep. 8, 2022

Related U.S. Application Data

(60) Provisional application No. 63/155,612, filed on Mar. 2, 2021.

(51) Int. Cl.
*E02F 3/36* (2006.01)
*E02F 3/34* (2006.01)
*E02F 3/96* (2006.01)

(52) U.S. Cl.
CPC .......... *E02F 3/3654* (2013.01); *E02F 3/3414* (2013.01); *E02F 3/96* (2013.01)

(58) Field of Classification Search
CPC ............. E02F 3/96; E02F 3/3414; E02F 3/3654–3681
See application file for complete search history.

(56) References Cited

U.S. PATENT DOCUMENTS

| | | |
|---|---|---|
| 4,955,779 A | 9/1990 | Knackstedt |
| 5,040,615 A | 8/1991 | Fletcher |
| 5,303,790 A | 4/1994 | Coleman |
| 5,346,018 A | 9/1994 | Koster |
| 5,657,825 A | 8/1997 | Englund |
| 7,278,502 B2 | 10/2007 | Trefz et al. |
| 7,690,439 B2 | 4/2010 | Priepke et al. |
| 8,950,525 B2 | 2/2015 | Marotte et al. |
| 9,868,350 B2 | 1/2018 | Murakawa et al. |
| 10,015,922 B2 | 7/2018 | Ribo |

(Continued)

FOREIGN PATENT DOCUMENTS

| | | |
|---|---|---|
| EP | 1067007 B1 | 7/2002 |
| EP | 2225925 A2 | 9/2010 |

(Continued)

OTHER PUBLICATIONS

PTO K-Connect Product Guide for the Kubota RTV-X1100C, Kubota Tractor Corporation, Oct. 2016, 8 pgs.

(Continued)

*Primary Examiner* — Tara Mayo
(74) *Attorney, Agent, or Firm* — Carlson, Caspers, Vandenburgh & Lindquist, P.A.

(57) ABSTRACT

An auxiliary motor is disposed on an attachment interface of a loader. The loader also has one or more primary motors providing motive power for the loader. The loader also includes lift arms having an attachment interface on a distal portion of the lift arms. The auxiliary motor is disposed on the attachment interface and an auxiliary motor interface is coupled to the auxiliary motor. The auxiliary motor is configured to transfer torque from the auxiliary motor to a powered attachment mounted to the attachment interface.

17 Claims, 6 Drawing Sheets

(56) References Cited

U.S. PATENT DOCUMENTS

| | | | |
|---|---|---|---|
| 10,843,565 B2 | 11/2020 | Briese et al. | |
| 2003/0074811 A1* | 4/2003 | Sprinkle et al. | E02F 9/2203 37/348 |
| 2006/0055140 A1* | 3/2006 | Trefz et al. | A01B 71/063 280/100 |
| 2006/0245903 A1 | 11/2006 | Albright et al. | |
| 2010/0275472 A1* | 11/2010 | Cunningham | B60P 1/5438 180/315 |
| 2014/0060219 A1* | 3/2014 | Marotte et al. | B60K 17/28 74/15.86 |
| 2015/0020892 A1 | 1/2015 | Behr et al. | |
| 2015/0275466 A1 | 10/2015 | Behr et al. | |
| 2018/0186233 A1* | 7/2018 | Briese et al. | B60K 25/06 |

FOREIGN PATENT DOCUMENTS

| | | | |
|---|---|---|---|
| EP | 2955988 A1 | 12/2015 | |
| WO | WO-9305242 A2 * | 3/1993 | A01B 13/08 |
| WO | WO-2006073351 A1 * | 7/2006 | A01B 59/068 |

OTHER PUBLICATIONS

Patent Cooperation Treaty, "International Search Report and Written Opinion", PCT/US2022/070917, Jul. 27, 2022, 11 pgs.

* cited by examiner

LOADER WITH AUXILIARY MOTOR ON ATTACHMENT INTERFACE AND ATTACHMENT THEREFORE

RELATED APPLICATIONS

This application claims the benefit of U.S. Provisional Application No. 63/155,612, filed on Mar. 2, 2021, entitled "Loader PTO System", which is hereby incorporated herein by reference.

BACKGROUND

Existing skid steer and other style loaders with lift arms utilize attachments which require hydraulic power to operate hydraulic motors on the attachments. As known to those skilled in the art, a hydraulic motor is a mechanical actuator that converts hydraulic pressure and flow into torque and angular displacement (rotation). The torque and angular displacement are coupled to one or more driven components on the attachment to rotate or otherwise move those driven components. Examples of attachments with a hydraulic motor include mower decks, snow blowers, post hole diggers, and tillers and the corresponding driven components include a mower blade and auger.

The hydraulic motor on the attachment is powered by a hydraulic power source (pump) that is on the loader. The loader includes plumbing (generally hoses) that fluidly couples a set of hydraulic quick couplers located on the front of the loader's lift arm(s) with the hydraulic pump on the loader. The attachment includes plumbing (again generally hoses) that fluidly couples a corresponding set of hydraulic quick couplers with the hydraulic motor on the attachment. By connecting the quick couplers of the attachment to the quick couplers of the loader, hydraulic power from the pump on the loader is coupled to the hydraulic motor on the attachment.

Typical skid steer and other loaders have hydraulic flow ratings from roughly 10 to 65 gallons per minute of flow depending on the size, option, and hp capacity of the loader. Powered attachments are usually sold separately from the loader and could be used with a loader anywhere within the range of hydraulic flow ratings. Thus, anywhere from 10 to 65 gallons per minute of flow (in this example) could be coupled to the attachment.

Hydraulic motors have mechanical design limits on the motor speed, motor pressure, and torque that cannot be exceeded otherwise damage to the motor will occur. Additionally, the mechanical (driven) components rotated by the hydraulic motor also have mechanical design aspects limiting the speed of, and force/torque applied to, those components. There can also be a major safety concern with respect to the speed of the driven components. As an example, rotary mowers are limited by safety standards to not exceed a blade tip speed of 17,000 feet per minute. Excess flow would cause excessive speed which could cause injury from striking objects and parts breaking off the mower. Because the flow rating coupled to the attachment could be higher than that supported by the hydraulic motor or driven components, the hydraulic motor on the attachment is required to have protection built in. This protection includes overspeed protection to limit the flow to the hydraulic motor and therefore protect against over-speeding the hydraulic motor or driven component(s). Overspeed protection is done by including flow limiting components on each attachment.

Another protection is from excessive hydraulic pressure. Typical skid steer and other loaders have pressure output ratings from roughly 2000 to 5000 psi. This pressure is managed by the attachment manufacturer to prevent damage to the hydraulic motor and the attachment itself.

Generally, existing skid steer and other loaders provide hydraulic power via an on/off valve, which can abruptly start and stop the attachment. Attachments include a hydraulic valve block to provide protection for the abrupt slowdown of the attachment.

As mentioned above, the attachment also includes plumbing from the hydraulic valve and hydraulic motor to a set of hydraulic couplers proximate the interface that mounts to the lift arm(s) of the loader. There are generally three hydraulic couplers that require coupling to a corresponding set of three hydraulic couplers on the lift arm(s). These include a female and male coupler for the main flow to the attachment and a case drain coupler. The case drain coupler is required on the hydraulic motor of many attachments to prevent over pressuring of the main case of the motor causing shaft seal damage.

The result of these requirements is that powered attachments include components to protect the attachment from excessive flow, excessive pressure, and other protection features like abrupt stopping. The components generally cost between $250 and $500 depending on the complexity. Powered attachments also have hydraulic couplings which cost roughly $75 to $200 depending on the style and flow capacity. Every attachment also has hydraulic hoses to go from the attachment's hydraulic motor to the hydraulic couplers and cost roughly $50 to $150.

The attachment couplers must be connected and disconnected each time the attachment is mounted and dismounted. This can be difficult, due to pressure build up on the lines, either due to thermal expansion or mechanical loading. Coupler damage is common since they are exposed during storage and this damage can make coupling difficult. When the attachment is disconnected, the couplers on both the vehicle and the attachment are prone to contamination. Often the coupling on the attachment can be found lying on the ground while in outdoor storage and the couplers become dirty and rusty. The couplers can be plugged or capped to try to reduce contamination, but generally such plugs are not used, especially on older machines. This contamination goes into the loader and the attachment, potentially damaging the hydraulic system. Couplers also vary between manufacturers. This can also make hookups more difficult or impossible. If the attachment is used on multiple loaders, a contaminated system of one loader, can contaminate all the others. Coupling the attachment to the loader is messy and always leads to some spillage—oily hands would be the minimum.

BRIEF DESCRIPTION

Embodiments for a loader including an auxiliary motor disposed on an attachment interface are provided. The loader has one or more primary motors providing motive power for the loader. The loader also includes lift arms having an attachment interface on a distal portion thereof. The auxiliary motor is disposed on the attachment interface and an auxiliary motor interface is coupled to the auxiliary motor. The auxiliary motor interface is configured to transfer torque from the auxiliary motor to a powered attachment mounted to the attachment interface.

Embodiments for a method of providing power to a powered attachment for a loader are also provided. The method includes providing power from a primary motor or battery pack of the loader to an auxiliary motor of the loader.

The primary motor of the loader provides motive power for the loader. The auxiliary motor of the loader, which is disposed on an attachment interface of the lift arms, provides torque to a powered attachment mounted to the attachment interface.

Embodiments for another loader are also provided. The loader includes one of wheels or tracks to provide motive ability for the loader. An internal combustion engine or one or more electric motors are coupled to the wheels or tracks to provide power thereto. The loader also includes hydraulicly powered lift arms and an attachment interface on a distal portion of the lift arms. The loader includes an auxiliary motor disposed on the attachment interface. An auxiliary motor drive interface is coupled to the auxiliary motor and configured to mate with a driven interface of a powered attachment mounted on the attachment interface. The auxiliary motor drive interface is configured to transfer torque from the auxiliary motor to the driven interface of the powered attachment.

Embodiments for a powered attachment for a loader are also provided. The powered attachment includes a mounting interface configured to removably mount the powered attachment to an attachment interface disposed on a distal portion of lift arms of the loader, such that the powered attachment is liftable by the lift arms. The powered attachment also includes a driven interface configured to receive torque from a drive interface to provide torque from an auxiliary motor on the attachment interface to the driven interface. The powered attachment also includes one or more driven components coupled to the driven interface to receive power from the driven interface.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

As discussed above, hydraulic powered attachments carry a lot of extra cost for protection, hydraulic hoses, and hydraulic couplings. Moreover, these costs are multiplied because they are needed on every powered attachment. In addition, hooking up hydraulic powered attachments can be difficult and messy. System contamination can also result from the hook up process, leading to lower life and/or increased maintenance costs.

Figure 1:
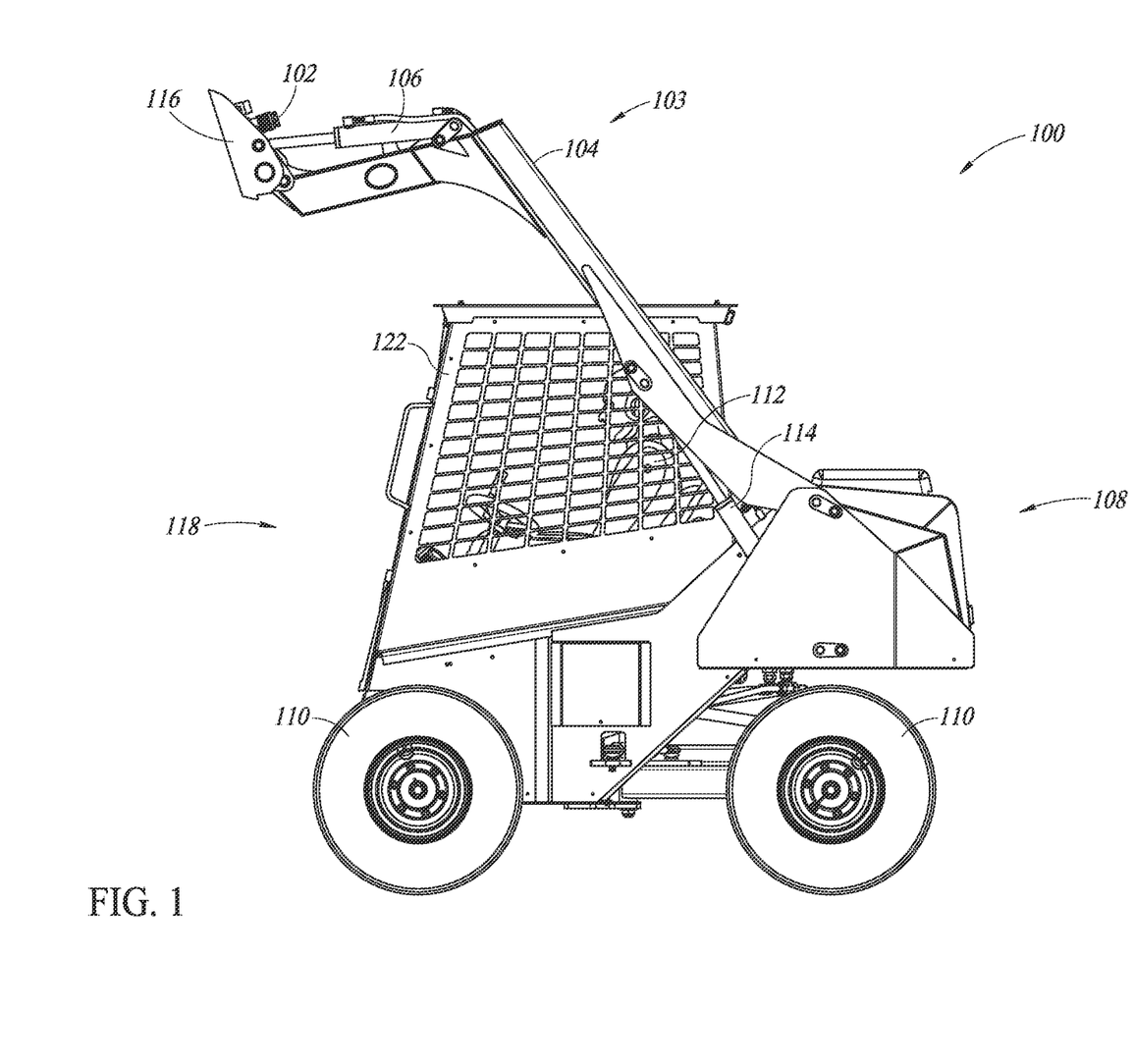
FIG. 1 is a side view of an example loader having an auxiliary motor disposed on an attachment interface for powering a powered attachment.

FIG. 1 is a perspective view of an example loader 100 that provides power for a powered attachment without requiring a hydraulic motor or other hydraulic components on the attachment. The loader 100 includes its own auxiliary motor 102, disposed on the attachment interface 116 of the loader 100, that provides power for a powered attachment mounted to the loader 100.

The loader 100 can have any suitable size or horsepower and can have any suitable form such as a wheel drive, track drive, skid steer, articulated steer, two-wheel steer, four-wheel steer, dedicated front end loader, or tractor-loader. The loader 100 includes a plurality of ground bearing wheels 110 or ground bearing tracks that enable movement of the loader 100 across the ground.

The loader 100 includes a cab 122 or other control station (e.g., uncovered) that includes a seat or standing platform for an operator 112 to ride on and which includes a human machine interface from which the operator 112 can operate the loader 100. The human machine interface can include any suitable human operable devices including one or more levers, joysticks, steering wheels, switches, touchscreens, buttons, and other devices enabling a human to provide control inputs to the loader 100.

The loader 100 also includes a lift arm assembly 103 that extends from the frame of the loader 100. The lift arm assembly 103 includes one or a pair of lift arms 104 that extend from the frame and an attachment interface 116 pivotably connected on a distal portion of the lift arm(s) 104 relative to the frame of the loader 100. One or more arm actuators 114, such as hydraulic cylinders, are coupled between the lift arm(s) 104 and a frame of the loader 100 to pivot (i.e., raise and lower) or otherwise move the lift arm(s) 104. Although the example lift arm(s) 104 of FIG. 1 can only be raised and lowered, in other examples the lift arm(s) can be rotated left and right and/or extended in length in addition to being raised and lowered. In the example shown in FIG. 1, the lift arm(s) 104 of the lift arm assembly 103 are rigid structures that have a single linkage. In other examples, the lift arm arm(s) 104 include multiple linkages.

FIG. 1 is a view of the loader 100 with the lift arm(s) 104 in a raised position. Although the example shown in FIG. 1 shows the lift arm(s) 104 disposed to the lateral sides of an operator 112, in other examples, the lift arm(s) 104 can be in front of or behind the operator 112. That is, other loader configurations and sizes can be used, including, for example, a front end loader, skid steer loader, track loader, swing loader, and telescoping loader. In an example, the lift arm(s) 104 extend generally forward (i.e., in the direction in which the operator 112 is facing) such that the attachment interface 116 is disposed at the front 118 of the loader 100 in front of the operator 112 while the operator 112 is operating the loader 100 from the cab 122 or other control station.

The attachment interface 116 a physical interface in which different attachments can be removably mounted thereto. The attachment interface 116 enables different attachments to be connected to and disconnected from the attachment interface 116 in the field to swap attachments on the loader 100. The attachment interface 116 is configured to have both non-powered and powered attachments removably mounted thereto. FIG. 1 shows an example attachment interface 116 without an attachment connected thereto.

As mentioned above, the attachment interface 116 is pivotably connected to a distal portion of the lift arm(s) 104. Thus, one end of the lift arm(s) 104 are pivotably connected to the frame of the loader 100 and the attachment interface 116 is pivotably connected to the opposite end of the lift arm(s) 116. Movement (e.g., pivoting) of the lift arm(s) 104 with respect to the frame of the loader 100 correspondingly moves (e.g., raises and lowers) the attachment interface 116 with respect to the frame of the loader 100. The attachment interface 116 can further pivot with respect to the lift arm(s) 104, enabling the orientation of the attachment interface 116 to be modified (e.g., vertically) with respect to the lift arm(s) 104. One or more attachment interface actuators 106, such as hydraulic cylinders, are coupled between the lift arm(s) 104 and the attachment interface 116 to pivot the attachment interface 116 with respect to the lift arm(s) 104. Although the example attachment interface 116 of FIG. 1 can only pivot vertically (i.e., about a horizontal axis), in other examples, the attachment interface 116 of FIG. 1 can pivot in other directions (e.g., horizontally) in addition to vertically.

In an example, the lift arm(s) 104 are configured with a large range of motion. For a mini loader, the lift arm(s) 104 can provide a range of motion for the attachment interface 116 that extends from the ground, upwards to a lift height of at least 5 feet above the ground. Small to medium sized loaders provide a lift height of at least 7 feet above the ground and medium to large loaders can provide a lift height greater than 10 feet.

Example non-powered attachments that can be removably mounted to the attachment interface 116 include a bucket, a rake, and a fork. Example powered attachments that can be removably mounted to the lift arm(s) 104 include an auger, a mower, a brush cutter, a powered brush, a snow blower, a tiller, a power rake/soil conditioner, a plow blade, a stump grinder, an edger/trencher, a wood chipper, a rotatable drum, a cutting wheel, a pump, a flywheel, and a lawn aerator. Other powered and non-powered attachments can also be used.

The loader 100 includes one or more primary motor(s) 108 that provide motive power for the loader 100 and power to move (e.g., pivot) the lift arm(s) 104 and attachment interface 116 of the loader 100. The primary motor(s) 108 are disposed on the frame of the loader 100 and can be any suitable power source, such as one or more internal combustion engines and/or one or more electric motors.

In an example, a single primary motor 108 (e.g., an internal combustion engine) provides motive power and power to move the lift arm(s) 104 and attachment interface 116. In an alternative example, multiple primary motors 108 (e.g., multiple electric motors) are used. In such an alternative example, one or more primary motors 108 (e.g., electric motor(s)) can provide motive power for the loader 100 and one or more other primary motors (e.g., electric motor(s)) can provide power to move the lift arm(s) 104 and attachment interface 116.

The primary motor(s) 108 that provide motive power are coupled to the wheels 110 or tracks to provide the power to rotate the wheels 110 or tracks and thereby move the loader 100 across the ground. The coupling between the primary motor(s) 108 and the wheels 110 or tracks can have any suitable form. In an example, the primary motor 108 includes an internal combustion engine having a primary hydraulic pump coupled to and driven by the internal combustion engine. The primary hydraulic pump can then provide hydrostatic power to the wheels 110 or tracks by being coupled to respective hydraulic motors that drive the wheels 110 or tracks. In an alternative example, the primary motors 108 include one or more electric motors that are coupled directly or indirectly to one or more wheels 110 or tracks to drive the respective wheel 110 or track.

One or more of the primary motor(s) 108 disposed on the frame of the loader 100 are coupled to the arm actuators 114 to provide power for raising, lowering, or otherwise moving the lift arm(s) 104. One or more of the primary motor(s) 108 disposed on the frame of the loader 100 are also coupled to the attachment interface actuators 106 to provide power for pivoting the attachment interface 116. The coupling between the primary motor(s) 108 and the actuators 114, 106 can have any suitable form. In the example above in which the primary motor 108 includes an internal combustion engine that powers the wheels 110 or tracks, one or more second hydraulic pumps can also be coupled to and driven by the internal combustion engine. The one or more second hydraulic pumps can be coupled to the arm actuators 114 and attachment interface actuators 106 to provide hydraulic power for movement of each. In the alternative example in which the primary motors 108 include one more electric motors that power the wheels 110 or tracks, the primary motors 108 can include one or more additional electric motors that are coupled directly or indirectly to the arm actuators 114 or attachment interface actuators 106 to provide power for movement of each.

As mentioned above, the loader 100 also includes an auxiliary motor 102 disposed on the attachment interface 116. The auxiliary motor 102 is an additional source of torque and an angular displacement, separate from the torque and angular displacement provided by the primary motor(s) 108. The one or more primary motor(s) 108 discussed above provide one or more first sources of torque and angular displacement which can be used for motive power and for movement of the lift arm(s) 104 and actuator interface 116 as discussed above. The auxiliary motor 102 does not provide motive power for the loader 100 or power to move the lift arm(s) 104 or actuator interface 116. Instead, the auxiliary motor 102 provides torque and angular displacement for a powered attachment removably mounted to the attachment interface 116. The auxiliary motor 102 can be a hydraulic motor or an electric motor.

The human machine interface enables the operator 112 to manually engage/disengage and, optionally, manually control other aspects of (e.g., the speed and/or direction of) the auxiliary motor 102. As mentioned above, the human machine interface can include any suitable human operable devices for operation of the auxiliary motor 102 including one or more switches, levers, or joysticks. The human machine interface can enable the auxiliary motor 102 to be engaged/disengaged and controlled independently of the one or more primary motor(s) 108, however, such engagement and control may be subject to any requirements for the one or more primary motor(s) 108 to provide power for the auxiliary motor 102.

In examples where the auxiliary motor 102 is a hydraulic motor, the loader 100 can provide hydraulic power to the auxiliary motor 102 via hydraulic fluid lines extending from an auxiliary hydraulic pump disposed on and driven by one of the primary motor(s) 108. Thus, the primary motor 108 can power the auxiliary hydraulic pump which provides power to the auxiliary motor 102 via hydraulic pressure and fluid flow to the auxiliary motor 102. The auxiliary hydraulic pump coupled to one of the primary motor(s) 108 can be sized to match the auxiliary motor 102, such as to provide a desired speed (e.g., 800 rpm) at the auxiliary motor 102. The loader 100 can also include a pressure regulation system to regulate the hydraulic pressure that is applied to the auxiliary motor 102 and shut down or spool down protection. In an example, the auxiliary hydraulic pump is a closed center pump which can provide smooth startups/stops.

In an example, the loader 100 can also provide support for a legacy powered attachment by including separate hydraulic fluid lines extending from the auxiliary hydraulic pump to hydraulic couplers on the loader arm(s) 104. A legacy powered attachment can then be powered by the auxiliary hydraulic pump by connecting the attachment's hydraulic fluid lines to the hydraulic coupled on the loader arm(s) 104. In another example, support for a legacy powered attachment can be provided by including hydraulic couplers inline in the hydraulic fluid lines between the auxiliary hydraulic pump and the auxiliary motor 102. The inline connectors can be disconnected and reconnected to hydraulic couplers on a legacy attachment. In either case, such legacy support can provide hydraulic fluid flow from the auxiliary hydraulic pump on the loader 100 to a hydraulic motor on the legacy attachment.

In an example, the speed of the auxiliary motor 102 is tied and proportional to the speed of the primary motor 108 driving the auxiliary hydraulic pump, such that the auxiliary motor 102 increases in speed in conjunction with an increase in speed (rpm) of the primary motor 108 driving the auxiliary hydraulic pump. In other examples, the speed of the auxiliary motor can be controlled independently of the speed of the primary motor(s) 108.

In examples where the auxiliary motor 102 is an electric motor, the loader 100 can provide electric power to the auxiliary motor 102 via electric wires extending from an alternator disposed on and driven by the primary motor 108 (e.g., an internal combustion engine). In yet other examples, the electric wires can extend from a battery pack on the frame of the loader 100 to the auxiliary motor 102. The battery pack that powers the auxiliary motor 102 can be a common battery pack that also provides power to one or more electric primary motors 108 on the frame of the loader 100. Thus, either an alternator on the primary motor 108 or a battery back on the frame of the loader 100 can power the electric auxiliary motor 102 via electric wires.

Figure 2:
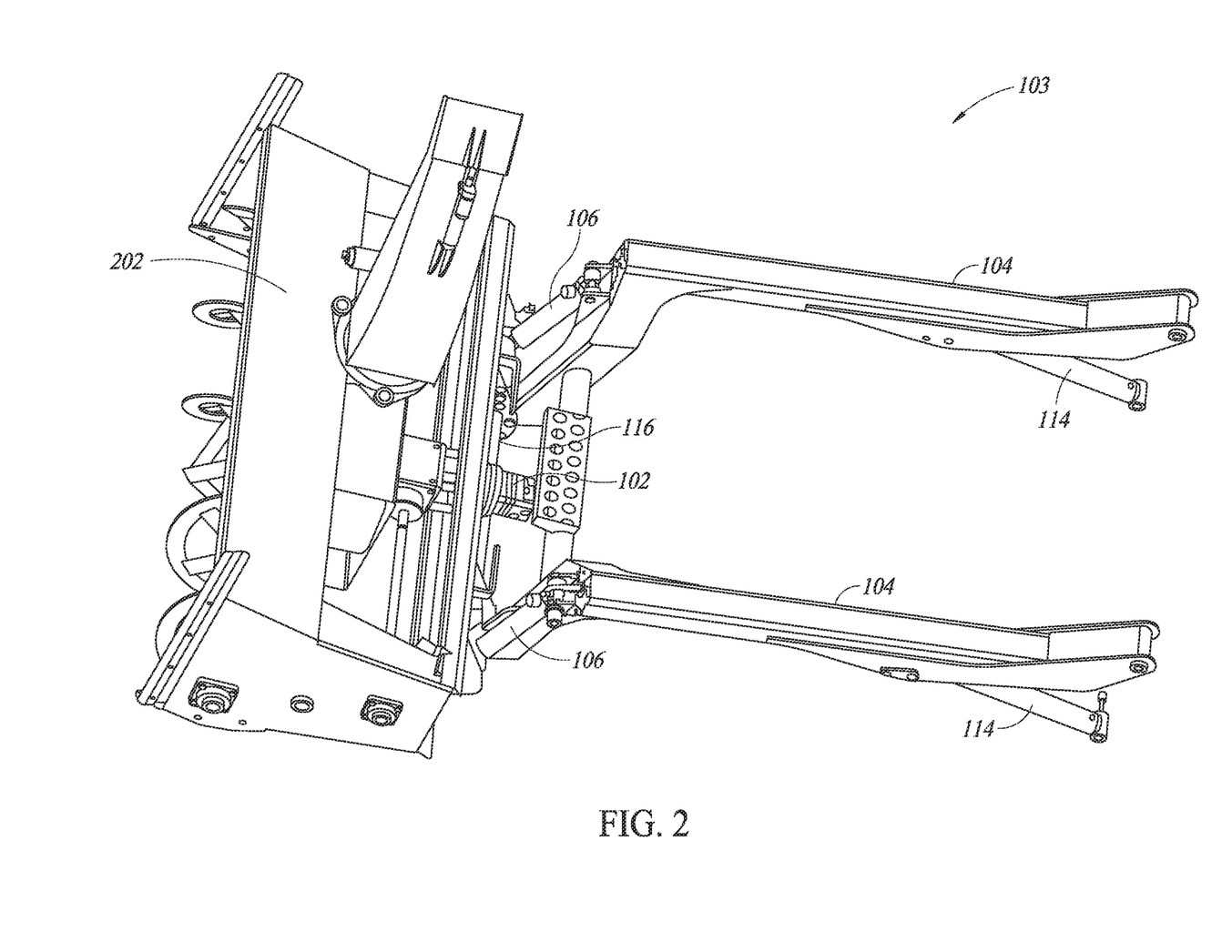
FIG. 2 is a perspective view of an example lift arm assembly having an auxiliary motor disposed on the attachment interface and an attachment mounted to the attachment interface.

FIG. 2 is a top perspective view of the lift arm assembly 103 having a powered attachment 202 mounted thereto. As discussed above, lift arm assembly 103 includes lift arm(s) 104 having an attachment interface 116 pivotably connected to a distal portion thereof. A powered attachment 202 can be removably mounted to the attachment interface 116, such that the powered attachment 202 moves with the lift arm(s) 104 and pivots with the attachment interface 116.

An auxiliary motor 102 is disposed on the attachment interface 116, such that as the attachment interface 116 is pivoted or otherwise moves, the auxiliary motor 102 pivots or otherwise moves with the attachment interface 116. Disposing the auxiliary motor 102 on the attachment interface 116 can enable easier coupling between the auxiliary motor 102 and the powered attachment 202, because the auxiliary motor 102 will pivot in conjunction with the powered attachment 202, both of which pivot with the attachment interface 116.

Figure 3:
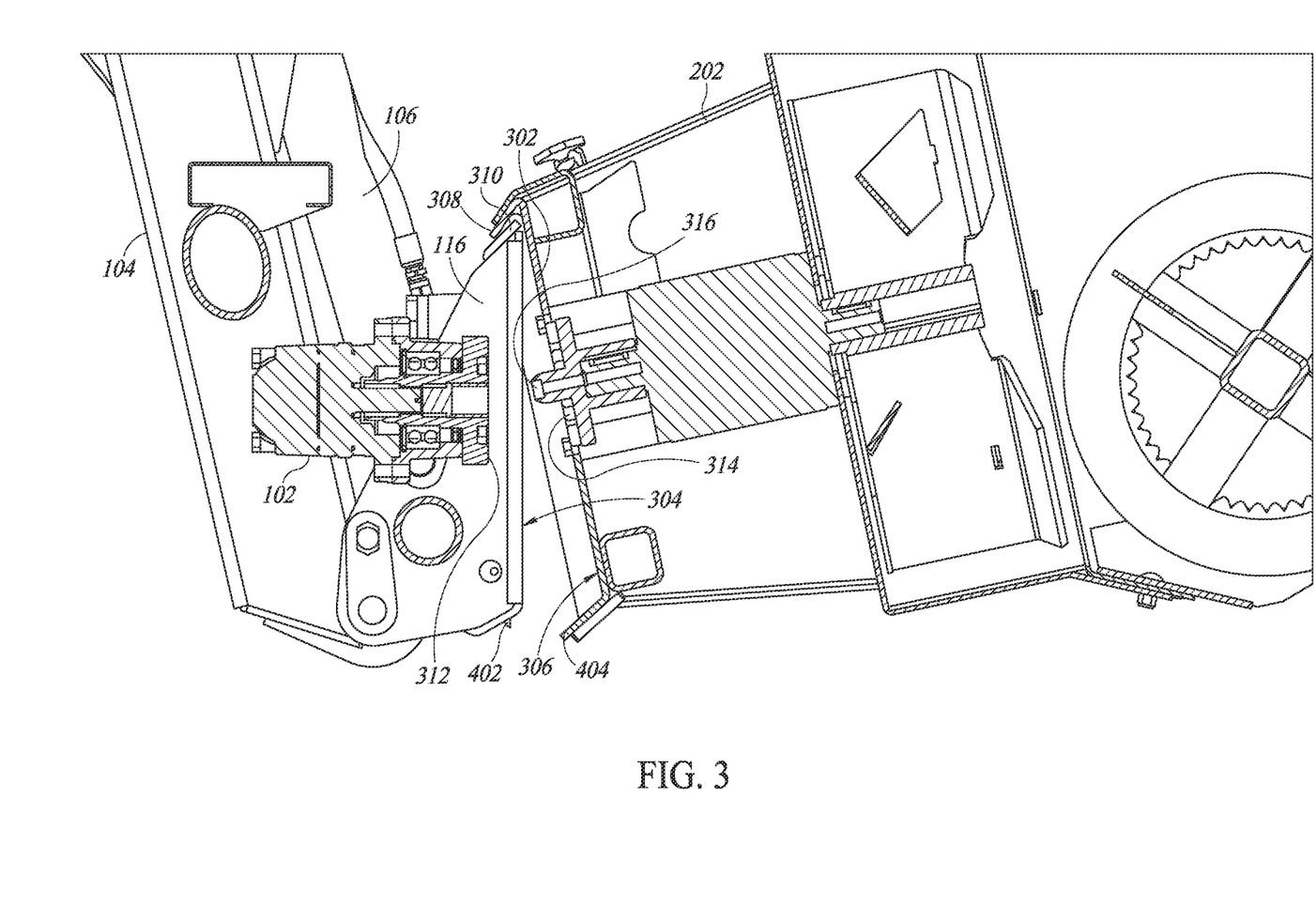
FIG. 3 is a cross-sectional view of an example attachment and attachment interface during the process of mounting the attachment to the attachment interface.

FIG. 3 is a cross-sectional view of the powered attachment 202 during the process of being mounted to the attachment interface 116 of the loader 100. In FIG. 3, the powered attachment 202 is disposed on the right side of the figure and the lift arm(s) 104 and attachment interface 116 are disposed on the left side of the figure.

Each attachment 202 for the loader 100 includes a mating interface 302 for removable connection with the attachment interface 116 of the loader 100. The mating interface 302 is a physical structure with a configuration that corresponds to the attachment interface 116 such that the mating interface 302 can removably connect with and be physically secured to the attachment interface 116. The attachment interface 116 and the mating interface 302 can include any suitable interface, now existing or to be developed, for connecting and disconnecting an attachment in the field. In an example, the attachment interface 116 and mating interface 302 can enable the attachment 202 to be connected and disconnected therefrom without the use of tools. Example suitable attachment interfaces 116 and mating interfaces 302 can be referred to in the industry as "quick attach" interfaces.

The attachment interface 116 and the mating interface 302 include respective rigid contact surfaces 304, 306 that bear against one another to aid in forming a rigid connection between the loader 100 and the attachment 202. In order to provide a rigid connection, the geometry of the contact surfaces 304, 306 correspond to (e.g., match or mate with) one another. FIGS. 1-3 show an example attachment interface 116 and mating interface 302 similar to those commonly used in North America. In this North American example, both contact surfaces 304, 306 are planar and provide a large area of contact to help maintain the mating interface 302 at the same orientation as attachment interface 116. Such a mating interface 302 can define an upper flange 308 that contacts and bears against a correspondingly angled upper surface 310 on the attachment interface 116. The flange 308 and angled upper surface 310 help the hold the attachment 202 in the same vertical position as the attachment interface 116, help hold the contact surface 306 against the contact surface 304 and provide additional support maintaining the orientation of the two interfaces 116, 302. When mounted, the mating interface 302 of the attachment 202 is fixed to the attachment interface 116 of the loader 100, such that the contact surfaces 304, 306 of the attachment interface 116 and mating interface 302 move in unison based on the movement of the lift arm(s) 104.

In other examples, the contact surfaces of the attachment interface and mating interface can have other geometries. In Europe, for example, a common attachment interface includes one or more arced contact surfaces on a top portion thereof onto which one or more hook shaped surfaces on an attachment can hook and bear. Contact between these two surfaces can provide the vertical and orientation stability similar to the top flange 308 of FIG. 3. This European attachment interface also includes one or more surfaces on a front facing portion thereof that align with one or more corresponding surfaces on the mating interface to provide additional orientation stability. These front-facing contact surfaces are held together in part by the hook and arced surfaces on the top of the interfaces. Other attachment and mating interfaces can also be used.

FIG. 3 shows a stage of initial engagement during connection of the mating interface 302 to the attachment interface 116. To connect an attachment 202 to the attachment interface 116, the loader 100 can be driven towards the attachment 202, which is resting on a surface such as the ground. The lift arm(s) 104 and the attachment interface 116 can be manipulated by the operator 112 to bring the upper surface 310 of the attachment interface 116 into contact with the upper flange 308 of the mating interface 302.

Figure 4:
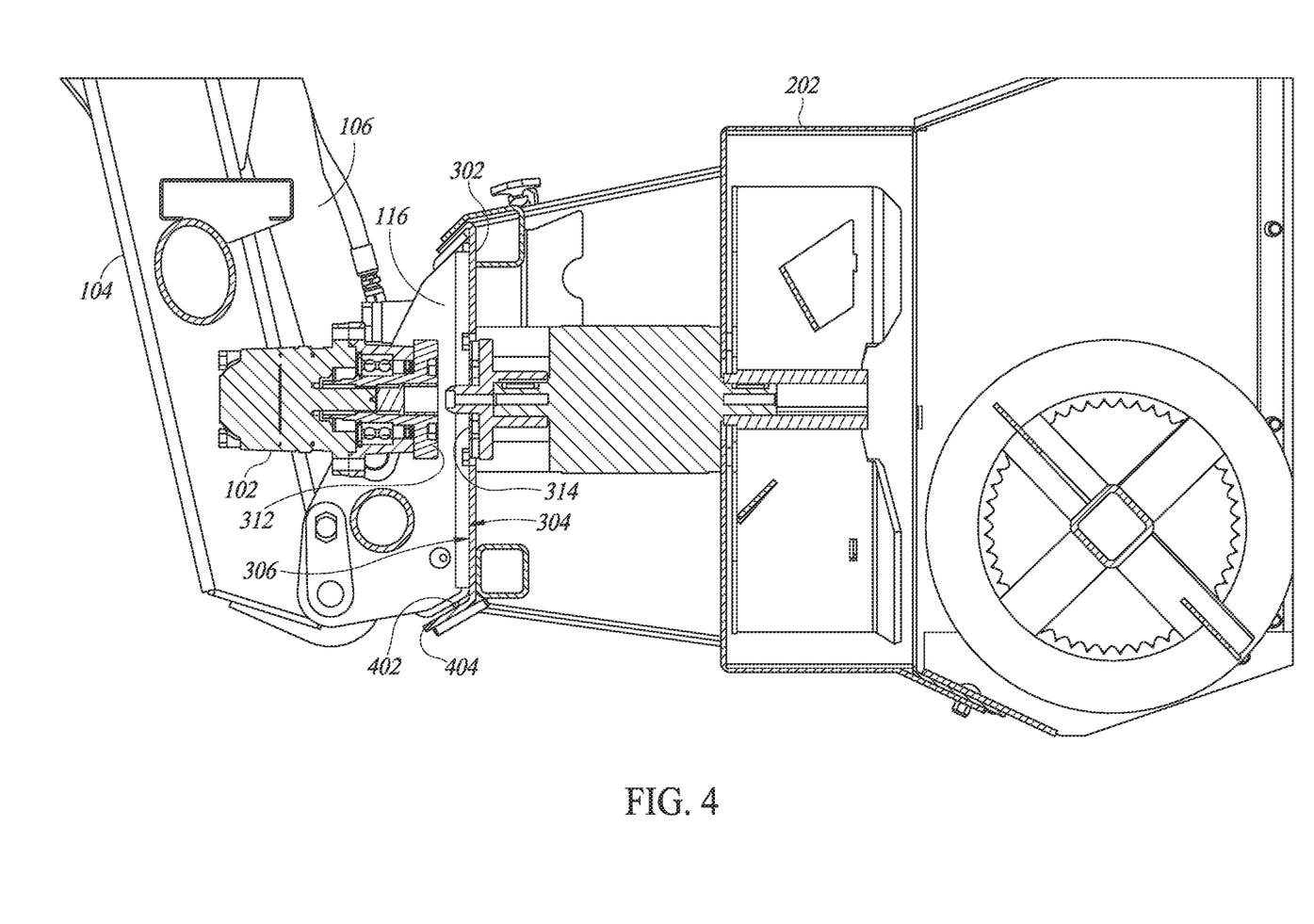
FIG. 4 is another cross-sectional view of the attachment and attachment interface of FIG. 3 during the process of mounting, wherein the contact surfaces of the attachment and the attachment interface are mated and the drive interface of the auxiliary motor is set back for protection during mounting.

FIG. 4 shows a subsequent stage of engagement during connection of the mating interface 302, in which the contact surfaces 304, 306 are in contact. As the attachment interface 116 is lifted, engagement between the flange 308 of the mating interface 302 and the upper surface 310 of the attachment interface 116 brings the contact surfaces 304, 306 into contact with one another. This also brings one or more movable pin(s) 402 of the attachment interface 116 into alignment with corresponding aperture(s) (not shown) in a lower flange 404 of the mating interface 302. In an example, the one or more movable pins 402 or other movable fasteners can be moved without tools (e.g., via a manual lever or hydraulic cylinder) to engage with the aperture and thereby secure the mating interface 402 to the attachment interface 116. The pin(s) and aperture(s) are used to secure the contact surfaces 304, 306 together, so that the attachment 202 cannot easily disconnect unintendedly.

Then, the pin(s) 402 can be extend into the aperture(s) to secure the contact surface 306 of the mating interface 302 to the contact surface 304 of the attachment interface 116. In an example, the pin(s) 402 can extend (move) in a direction generally parallel with the contact surfaces 304, 306. While the pin(s) 402 is/are engaged in the aperture(s), the pin(s) 402 can restrict movement of the contact surface 306 away from the contact surface 304 thereby securing the two contact surfaces 304, 306 together during use.

To disconnect the attachment 202, the pin(s) 402 can be retracted, withdrawing them from their corresponding aperture(s). The attachment interface 116 can then be lowered to rest the attachment 202 on the ground (or other surface) until the upper surface 310 of the attachment interface 116 disengages from the flange 308 of the mating interface 302. The loader 100 can then be moved backward, away from the attachment 202. The loader 100 is then disconnected from the attachment 202 and can be moved independently of the attachment 202.

Referring back to FIG. 3, the auxiliary motor 102 can include a drive interface 312 that is configured to transfer torque and angular displacement from the auxiliary motor 102 to a powered attachment. The drive interface 312 is a physical interface that is configured to mate with a driven interface 314 of the attachment 202. The mating between the drive interface 312 and the driven interface 314 is configured to transfer torque and angular displacement from the auxiliary motor 102 to the driven interface 314.

The drive interface 312 can be disposed on the attachment 116 to enable mating with the driven interface 314 disposed on the mating interface 302. In particular, the drive interface 312 and the driven interface 314 can be disposed such that the two interfaces 312, 314 are aligned while the attachment 202 is mounted to the attachment interface 116. Any suitable features (e.g., flange 308) on the attachment 202 and attachment interface 116 can be used to facilitate that alignment. In an example, the drive interface 312 is disposed generally flush with the contact surface 304 of the attachment interface 116 and the driven interface 314 is disposed generally flush with the contact surface 306 of the mating interface 302.

In the example shown in FIGS. 3 and 4, however, the drive interface 312 can be set into multiple positions. A first position (also referred to herein as the "disengaged position") is shown in FIGS. 3 and 4 in which the drive interface 312 is set back from (i.e., behind and not flush with) the contact surface 304. The disengaged position is set such that when the mating interface 302 is secured to the attachment interface 116, the drive interface 312 is spaced apart and not mated with the driven interface 314. This spacing can reduce contact between the drive interface 312 and driven interface 314 during initial alignment of the mating interface 302 and the attachment interface 116. The reduction in contact can reduce the chance of damage to the drive interface 312 or driven interface 314 due to temporary misalignment during the mounting process.

Figure 5:
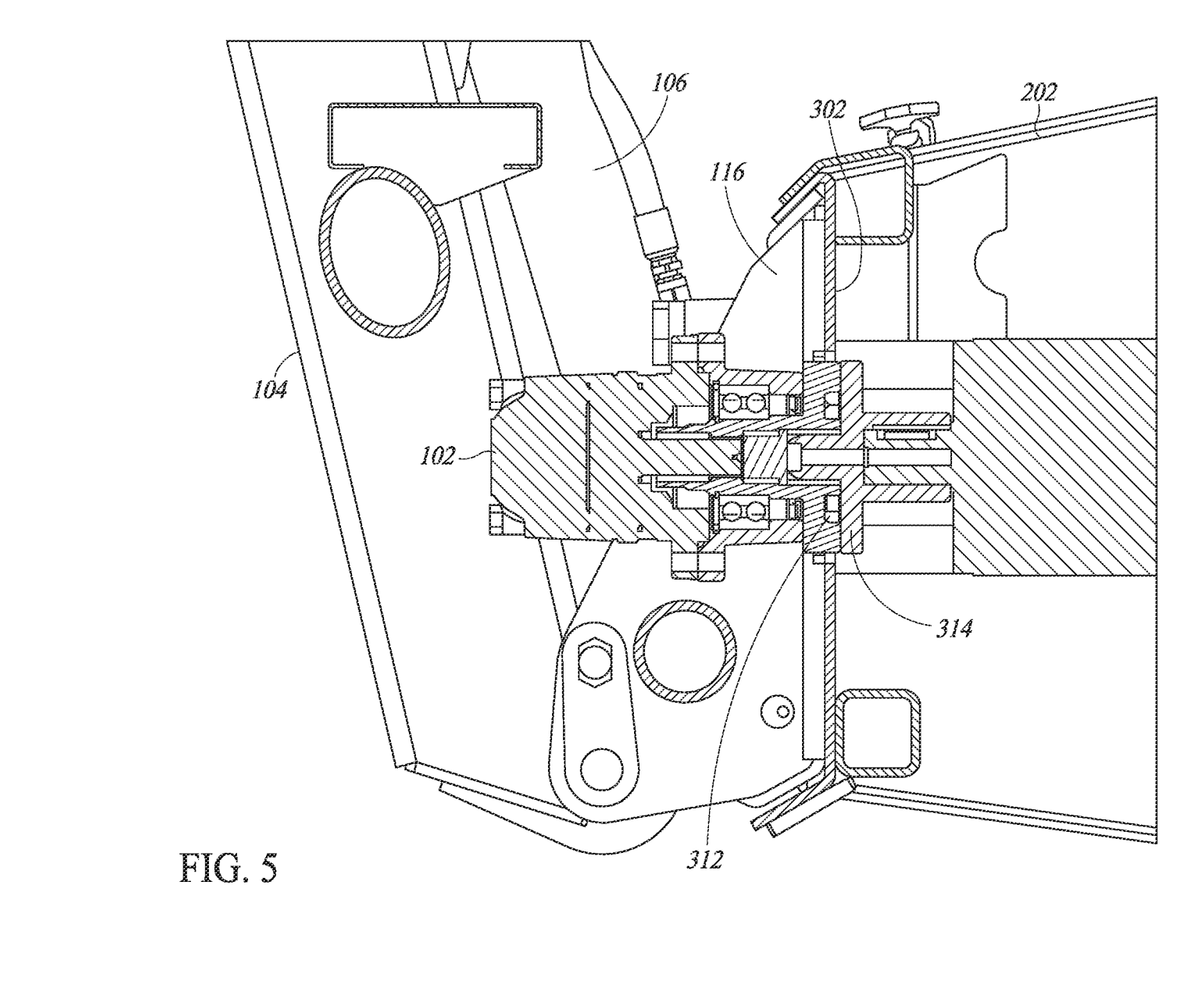
FIG. 5 is a cross-sectional view of the attachment and attachment interface of FIG. 3 showing the drive interface of the auxiliary motor moved into its mating position to mate with the driven interface of the attachment.

FIG. 5 is a cross-sectional view of the powered attachment 202 mounted to the attachment interface 116 of the loader 100 showing the drive interface 312 in a second position (also referred to herein as the "engaged position"). In the engaged position, the drive interface 312 is positioned forward (i.e., towards the mating interface 302) with respect to the disengaged position shown in FIGS. 3 and 4. The engaged position disposes the drive interface 312 such that it mates with the driven interface 314 while the mating interface 302 is mounted to the attachment interface 116. While mated, a spline on the drive interface 312 engages with a spline on the driven interface 314 enabling transfer of torque and angular displacement from the drive interface 312 to the driven interface 314. In an example, the drive interface 312 can be generally aligned with the contact surface 304 of the attachment interface 116 while in the engaged positioned.

In an example, a manual lever can be used to move the drive interface 312 between the engaged and disengaged positions. In another example, a hydraulic cylinder moves the drive interface 312 between the engaged and disengaged positions. In some examples, the auxiliary motor 102 is mounted to the attachment interface 116 in a manner that allows minor movement (play) of the motor 102 to account for minor misalignment during the mounting process.

In the examples shown in FIGS. 3-5, the drive interface 312 is disposed within (e.g., in the face defined by) the contact surface 304. In a more specific example, the drive interface 312 is disposed in a center of the contact surface 304. Similarly, the driven interface 314 can be disposed proximate the contact surface 306 of the mating interface 302. In a specific example, the driven interface 314 can be disposed within (e.g., in the face defined by) the contact surface 306. In a more specific example, the driven interface 314 is disposed in a center of the contact surface 306.

Figure 6:
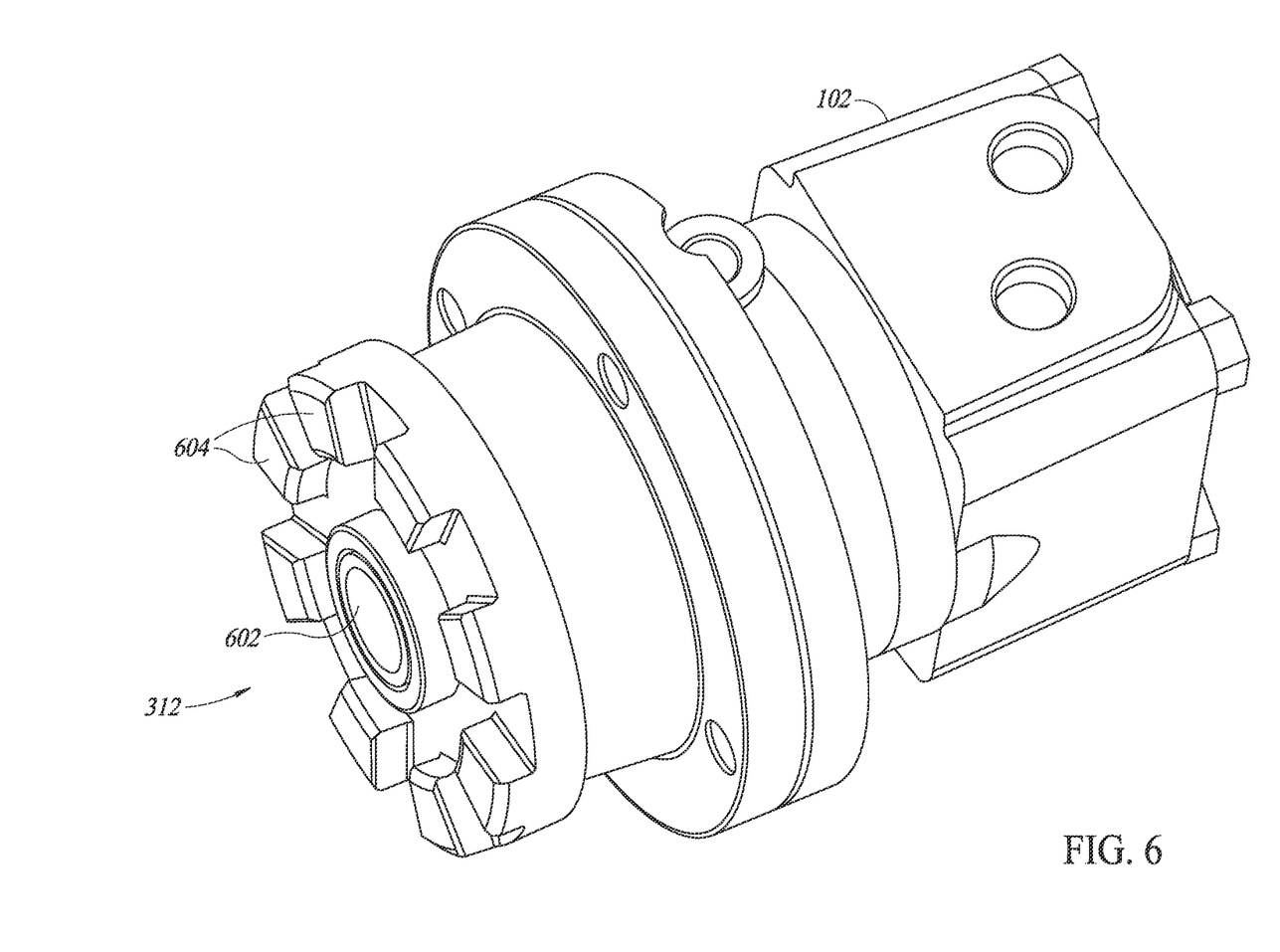
FIG. 6 is a perspective view of an example auxiliary motor and drive interface.

FIG. 6 is a perspective view of the auxiliary motor 102 and drive interface 312 of FIGS. 3-5. The drive interface 312 can have any suitable form. In example, the drive interface 312 defines a spline to which a mating spline of the driven interface 314 can be coupled. In the example shown in FIG. 6, the drive interface 312 defines a centering aperture 602 that is configured to mate with a tapered post (316 of FIG. 3) on the driven interface 314. The centering aperture 602 and tapered post 316 guide the driven interface 314 to align with the drive interface 312 during mounting of the attachment 202 to the attachment interface 116. The centering aperture 602 can include a bushing around an inside surface thereof to provide vibrational isolation between the drive interface 312 and the driven interface 314. The example drive interface 312 of FIG. 6 also defines a plurality of teeth 604 circumferentially disposed around the centering 602, which mate with corresponding features on the driven interface 314 to transfer torque from the drive interface 312 to the driven interface 314. Although an example configuration for the drive interface 312, other configurations can also be used, such as including a centering aperture on the driven interface and a tapered post on the drive interface.

In the example shown in FIGS. 3-6, the drive interface 312 and driven interface 314 are held together via the securing of the mating interface 302 to the attachment interface 116. That is, the driven interface 314 is fixedly mounted to the mating interface 302 and the drive interface 312 is fixedly mounted to the attachment interface 116, such that securing the mounting and attachment interfaces 312, 314 together also maintains the drive interface 312 and drive interface 314 in a mated relationship. In examples where the drive interface 312 or driven interface 314 have multiple positions (e.g., an engaged and disengaged position), securing of the mating interface 302 to the attachment interface 116 maintains the drive interface 312 and driven interface 314 in a mated relationship while both are in the engaged positions. Advantageously, utilizing the rigid connection between the mating interface 302 and the attachment interface 116 to maintain the mated relationship of the drive interface 312 and the driven interface 314 can provide more simple connections of the powered attachment 202, because separate pins or the like are not needed to couple the drive interface 312 to the driven interface 314. For example, in some embodiments, the driven interface 314 can be mated with the drive interface 312 without requiring the operator 112 to leave the cab 122.

In the example shown herein, the drive interface 312 is a direct drive of the auxiliary motor 102. That is, there is no gear, chain, belt, angular joints (e.g., a universal joint), or the like transferring torque between the auxiliary motor 102 and the drive interface 312. The driven interface 314 also couples directly with the drive interface 312, such that the driven interface 314 is a direct drive of the auxiliary motor 102 while the attachment 202 is mounted.

In other examples, the drive interface and driven interface can have other forms to transfer torque from the auxiliary motor 102 to the attachment 202. In one such other example, the drive interface can include a drive pulley coupled to the auxiliary motor 102 and the driven interface can include a driven pulley disposed on the attachment 202. The drive pulley and driven pulley can be respectively disposed such that a belt can be mounted to extend between the drive pulley and driven pulley to transfer torque from the drive pulley and driven pulley. In other examples, yet other means of transferring power from the auxiliary motor to the attachment can be used.

In still other examples, the auxiliary motor 102 is disposed on the lift arm(s) 104 instead of on the attachment interface 116 and an indirect drive, such as a plurality of links and universal joints, couple the auxiliary motor 102 to the powered attachment 202.

In any case, the attachment 202 can include a torque and angular displacement transmission to transfer the torque and angular displacement from the driven interface 314 to the driven component(s) of the attachment 202, such as an auger, mower blade, or brush. Any suitable transmission can be used including shafts, universal joints, belts, or gears.

Powering the attachment 202 from an auxiliary motor 102 disposed on the attachment interface 116 or lift arm(s) 104 can provide many advantages. The attachments 202 can be lower cost to manufacture because they do not need a hydraulic or electric motor and associated hoses and wires, protection valves, and couplers. Instead of having a separate motor on each attachment, a single auxiliary motor 102 on the loader 100 can drive multiple attachments. The auxiliary motor 102 can also eliminate the efficiency loss due to valve block flow controls, flow splitters, etc. Use of a valve block on legacy attachments to regulate the speed, pressure or excess flow or pressure causes hydraulic fluid to be bypassed back to the loader 100, which is inefficient and results in increased heat and fuel consumption.

For examples in which the auxiliary motor 102 is a hydraulic motor, the auxiliary hydraulic pump and heat exchanger on the loader 100 can be optimized and matched to a single hydraulic motor, instead of having to be used with multiple hydraulic motors on multiple attachments. The coupling of power between the loader 100 and the attachment 202 can also be a physical interface rather than a hydraulic interface, reducing the mess and difficulty associated with such a hydraulic interface. The risk of contaminating the hydraulic system is also reduced due to lack of exposed hydraulic couplers when disconnected from an attachment and elimination of shared hydraulic fluid between attachment and loader 100.

The auxiliary motor 102 may also provide a straightforward hookup that is less likely for an operator to shortcut like the chance of not hooking up the drain coupler in existing hydraulicly powered attachments. Not hooking up the drain coupler is typically a main reason that hydraulic motor seals on the hydraulic motor of the attachment are damaged. Finally, powering the auxiliary motor 102 from a source (primary motor 108 or battery pack) on the frame of the loader 100 disposes the larger components on the frame of the loader 100 while the smaller auxiliary motor 102 is disposed on the attachment interface 116.

What is claimed is:

1. A loader comprising:
   one or more primary motors providing motive power for the loader;
   a lift arm assembly that is pivotably connected to a frame of the loader, the lift arm assembly including one or more lift arm(s) and an attachment interface that is pivotably connected to the lift arm(s), wherein the attachment interface defines a contact surface upon which a corresponding contact surface of a powered attachment bears while the powered attachment is mounted to the attachment interface;
   an auxiliary motor disposed on the attachment interface; and
   an auxiliary motor interface coupled to the auxiliary motor and configured to transfer torque from the auxiliary motor to the powered attachment mounted to the attachment interface,
   wherein the auxiliary motor interface is disposed proximate the contact surface of the attachment interface,
   wherein the auxiliary motor interface defines a plurality of teeth for engaging with corresponding teeth in a driven interface of the powered attachment,
   wherein the auxiliary motor interface has a disengaged position in which the auxiliary motor interface is configured to be disengaged from a driven interface of the powered attachment and the plurality of teeth are set back from the contact surface of the attachment interface,
   wherein the auxiliary motor interface has an engaged position in which the auxiliary motor interface is configured to engage with the driven interface of the power attachment and the plurality of teeth are flush with the contact surface of the attachment interface.

2. The loader of claim 1, wherein the auxiliary motor is a hydraulic motor and the loader comprises hydraulic fluid lines coupled between the auxiliary motor and an auxiliary hydraulic pump driven by the one or more primary motors to provide power from the one or more primary motors to the auxiliary motor.

3. The loader of claim 1, wherein the auxiliary motor is an electric motor and the loader comprises electric wires coupled between the auxiliary motor and an alternator of the one or more primary motors or a battery pack to provide power from the one or more primary motors to the auxiliary motor.

4. The loader of claim 1, wherein the primary motor is an internal combustion engine or one or more electric motors.

5. The loader of claim 1, wherein the auxiliary motor interface defines a spline that is configured to mate with a mating spline of the powered attachment.

6. The loader of claim 1, wherein the auxiliary motor interface is a direct drive of the auxiliary motor.

7. The loader of claim 1, wherein the powered attachment is one of: an auger, a mower, a brush cutter, a powered brush, a snow blower, a tiller, a power rake/soil conditioner, a plow blade, a stump grinder, an edger/trencher, a wood chipper, a rotatable drum, a cutting wheel, a pump, a flywheel, or a lawn aerator.

8. The loader of claim 1, comprising a lever coupled to the auxiliary motor interface, wherein movement of the lever by a user moves the auxiliary motor interface between the engaged and disengaged positions.

9. The loader of claim 1, comprising a hydraulic cylinder coupled to the auxiliary motor interface, wherein actuation of the hydraulic cylinder moves the auxiliary motor interface between the engaged and disengaged positions.

10. A loader comprising:
one of wheels or tracks to provide motive ability for the loader;
an internal combustion engine or one or more electric motors coupled to the wheels or tracks to provide power thereto;
hydraulicly powered lift arms;
an attachment interface pivotably connected to a distal portion of the lift arms, wherein the attachment interface defines a contact surface upon which a corresponding contact surface of a powered attachment bears while the powered attachment is mounted to the attachment interface;
an auxiliary motor disposed on the attachment interface; and
an auxiliary motor drive interface coupled to the auxiliary motor and configured to mate with a driven interface of a powered attachment mounted to the attachment interface, the auxiliary motor drive interface configured to transfer torque from the auxiliary motor to the driven interface of the powered attachment,
wherein the auxiliary motor drive interface is disposed proximate the contact surface of the attachment interface,
wherein the auxiliary motor drive interface defines a plurality of teeth for engaging with corresponding teeth in the driven interface of the powered attachment,
wherein the auxiliary motor drive interface has a disengaged position in which the auxiliary motor drive interface is configured to be disengaged from a driven interface of the powered attachment and the plurality of teeth are set back from the contact surface of the attachment interface,
wherein the auxiliary motor drive interface has an engaged position in which the auxiliary motor drive interface is configured to engage with the driven interface of the power attachment and the plurality of teeth are flush with the contact surface of the attachment interface.

11. The loader of claim 10, wherein the auxiliary motor is a hydraulic motor and the loader comprises hydraulic fluid lines coupled between the auxiliary motor and the auxiliary hydraulic pump of the internal combustion engine to provide power from the internal combustion engine to the auxiliary motor.

12. The loader of claim 10, wherein the auxiliary motor is an electric motor and the loader comprises electric wires coupled between the auxiliary motor and an alternator of the primary motor or a battery pack for the one or more electric motors to provide power to the auxiliary motor.

13. The loader of claim 10, wherein the attachment interface defines a contact surface upon which a corresponding contact surface of an attachment bears while the attachment is mounted to the attachment interface, wherein the auxiliary motor drive interface is disposed proximate the contact surface of the attachment interface.

14. The loader of claim 10, wherein the auxiliary motor drive interface defines a spline that is configured to mate with a mating spline of the driven interface of the powered attachment.

15. The loader of claim 10, wherein the powered attachment is one of: an auger, a mower, a brush cutter, a powered brush, a snow blower, a tiller, a power rake/soil conditioner, a plow blade, a stump grinder, an edger/trencher, a wood chipper, a rotatable drum, a cutting wheel, a pump, a flywheel, or a lawn aerator.

16. The loader of claim 10, comprising a lever coupled to the auxiliary motor drive interface, wherein movement of the lever by a user moves the auxiliary motor drive interface between the engaged and disengaged positions.

17. The loader of claim 10, comprising a hydraulic cylinder coupled to the auxiliary motor drive interface, wherein actuation of the hydraulic cylinder moves the auxiliary motor drive interface between the engaged and disengaged positions.

* * * * *